(12) United States Patent
Kubo (10) Patent No.: US 6,606,713 B1
(45) Date of Patent: Aug. 12, 2003

(54) MICROCOMPUTER INCLUDING CIRCUITRY FOR DETECTING AN UNAUTHORIZED STOPPAGE OF THE SYSTEM CLOCK SIGNAL

(75) Inventor: Kenji Kubo, Hyogo (JP)

(73) Assignees: Mitsubishi Denki Kabushiki Kaisha, Tokyo (JP); Mitsubishi Electric System LSI Design Corporation, Itami (JP)

( * ) Notice: Subject to any disclaimer, the term of this patent is extended or adjusted under 35 U.S.C. 154(b) by 0 days.

(21) Appl. No.: 09/568,539

(22) Filed: May 11, 2000

(30) Foreign Application Priority Data

Nov. 17, 1999 (JP) .......................................... 11-327229

(51) Int. Cl.[7] .............................................. G06F 1/04
(52) U.S. Cl. ..................................... 713/501; 713/601
(58) Field of Search ............................... 713/300, 320, 713/322, 500, 501, 600, 601; 714/100, 10, 21, 23, 49, 50, 798

(56) References Cited

U.S. PATENT DOCUMENTS

| | | | | |
|---|---|---|---|---|
| 5,155,840 A | * | 10/1992 | Niijima ....................... | 713/400 |
| 5,261,082 A | * | 11/1993 | Ito et al. ..................... | 713/501 |
| 5,848,281 A | * | 12/1998 | Smalley et al. ............. | 713/322 |
| 5,936,452 A | * | 8/1999 | Utsuno et al. ............... | 327/292 |
| 6,343,334 B1 | * | 1/2002 | Uemura et al. ................ | 710/8 |

FOREIGN PATENT DOCUMENTS

| | | |
|---|---|---|
| JP | 3-231319 | 10/1991 |
| JP | 6-124135 | 5/1994 |

* cited by examiner

Primary Examiner—Dennis M. Butler
(74) Attorney, Agent, or Firm—Burns, Doane, Swecker & Mathis, LLP

(57) ABSTRACT

A microcomputer comprises a selecting unit for selecting one of a plurality of clock signals generated by a plurality of clock generating sources according to a selection instruction from a central processing unit or CPU, a clock generation stop unit, responsive to a stop instruction to stop generation of a clock signal other than the selected clock signal from the CPU, for causing a corresponding clock generating source to stop the generation of the clock signal, and an unauthorized stop process detecting unit, responsive to a stop instruction to stop the generation of the selected clock signal from the CPU, for determining that the CPU has provided an instruction to perform an unauthorized process of causing a selected clock generating source to stop the generation of the selected clock signal. When the unauthorized stop process detecting unit determines that the CPU has provided an instruction to perform an unauthorized process of causing a selected clock generating source to stop the generation of the selected clock signal, it can furnish an interruption signal to the CPU.

8 Claims, 7 Drawing Sheets

CLOCK GENERATING CIRCUIT 13

SYSTEM CLOCK

RESET CAUSED BY AN UNAUTHORIZED SWITCHING PROCESSING

RESET SIGNAL

32

REGISTER ~16

19
19c
19a
19b
SWITCH

REGISTER ~14

20

17 ~ MAIN-CLOCK GENERATING CIRCUIT

31 ~ MAIN-CLOCK GENERATION STOP DETECTING UNIT

18 ~ SUB-CLOCK GENERATING CIRCUIT

21

REGISTER ~15

12 ~ BUS

11 ~ CPU

FIG.7 (PRIOR ART)

MICROCOMPUTER INCLUDING CIRCUITRY FOR DETECTING AN UNAUTHORIZED STOPPAGE OF THE SYSTEM CLOCK SIGNAL

BACKGROUND OF THE INVENTION

1. Field of the Invention

The present invention relates to a microcomputer including a plurality of clock generating sources built therein.

2. Description of the Prior Art

A typical microcomputer mounted in equipment includes a plurality of clock generating sources and selects one of them best suited to the use and operating condition of the microcomputer.

For example, a high-speed clock signal having a frequency in a MHz range is selected when the microcomputer is in a normal operating condition, whereas a low-speed clock signal having a frequency of 32 kHz is selected and a clock generating source for generating the high-speed clock is stopped to reduce the power consumption when the microcomputer is idle, that is, when it is in a sleep state.

Figure 7:
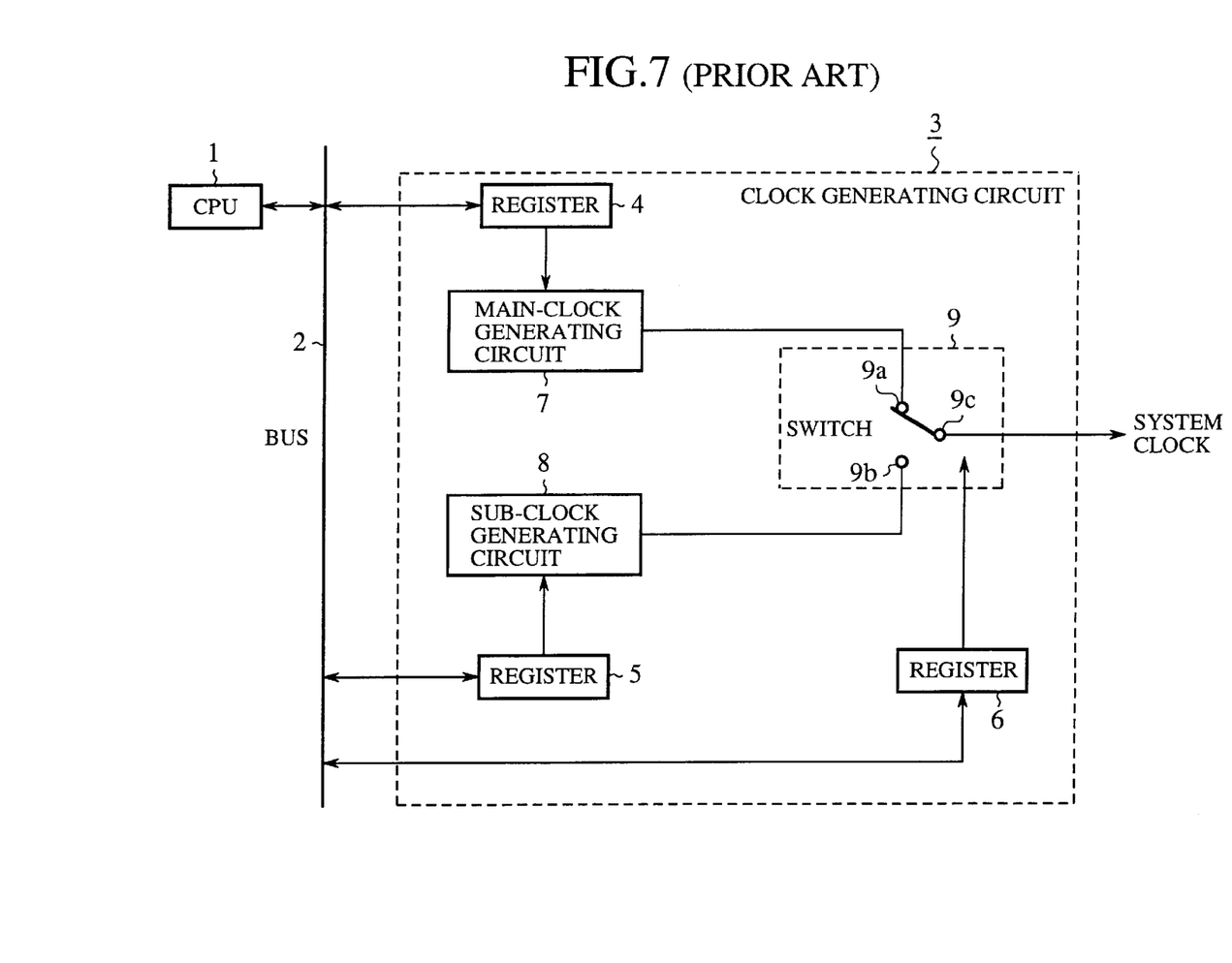
FIG. 7 is a block diagram showing the structure of a prior art microcomputer.

Referring next to FIG. 7, it illustrates a block diagram showing the structure of such a prior art microcomputer. In the figure, reference numeral 1 denotes a central processing unit or CPU built in the microcomputer, numeral 2 denotes a bus for connecting the CPU 1 to a clock generating circuit 3 for generating a clock signal as a system clock, numeral 4 denotes register for storing a control value to control the oscillating state of a main-clock generating circuit 7, numeral 5 denotes register for storing a control value to control the oscillating state of a sub-clock generating circuit 8, and numeral 6 denotes a register for storing a control value to control a switch 9 so that the switch 9 switches between two destinations or two input terminals to connect one of them to its output terminal.

The main-clock generating circuit 7 generates a high-speed clock signal or main-clock signal having a frequency in a MHz range. The sub-clock generating circuit 8 generates a low-speed clock signal having a frequency lower than that of the high-speed clock signal generated by the main-clock generating circuit 7. The switch 9 selects either the high-speed clock signal from the main-clock generating circuit 7 applied thereto via the input terminal 9a thereof or the low-speed clock signal from the sub-clock generating circuit 8 applied thereto via the other input terminal 9b thereof, and then furnishes the selected clock signal, via the output terminal 9c, to the CPU 1 and so on in the microcomputer.

In operation, when there is a need to provide a high-speed operating condition, the CPU 1 stores a control value "0" in the register 4 and stores a control value "1" in the register 5 in order to use the high-speed clock signal generated by the main-clock generating circuit 7. The CPU 1 further stores a control value "1" in the register 6.

As a result, the main-clock generating circuit 7 starts generating the high-speed clock signal, whereas the sub-clock generating circuit 8 stops the generation of the low-speed clock signal. The switch 9 connects the output terminal 9c to the first input terminal 9a so as to furnish the high-speed clock signal generated by the main-clock generating circuit 7, as the system clock, to the CPU 1 and so on.

In contrast, when the CPU 1 keeps the sleep state, it writes control values into the registers 4 to 6 to select the low-speed clock signal generated by the sub-clock generating circuit 8 and stop the oscillation of the main-clock generating circuit 7 to reduce the power consumption. In this case, the CPU 1 stores a control value "1" in the register 4 and stores a control value "0" in the register 5 in order to use the low-speed clock signal generated by the sub-clock generating circuit 8. The CPU 1 further stores a control value "0" in the register 6.

As a result, the sub-clock generating circuit 8 starts generating the low-speed clock, whereas the main-clock generating circuit 7 stops the generation of the high-speed clock signal. The switch 9 connects the output terminal 9c to the second input terminal 9b so as to furnish the low-speed clock signal generated by the sub-clock generating circuit 8, as the system clock, to the CPU 1 and so on.

While a prior art microcomputer constructed as above can select a clock signal best suited to the use and operating condition of the microcomputer, it suffers from a problem that if the CPU 1 malfunctions and then stores a control value "1" in both the registers 4 and 5, both of the main-clock and sub-clock generating circuits 7 and 8 stop the generation of the high-speed and low-speed clocks and the system therefore comes to a deadlock. In this case, the deadlock is a state in which any operation other than power shutdown and resetting of the system cannot return the system to its original state. The deadlock in which the control process is locked and the system cannot be returned to its original state can thus be fatal to the equipment equipped with the microcomputer.

Japanese Patent Application Publication (TOKKAIHEI) No. 3-231319 discloses a method of allowing a selected clock generating source to neglect an instruction to stop generation of a clock signal, and to continue to generate the clock signal, in order to prevent the system from coming to a deadlock. In the prior art, since the CPU, however, cannot determine whether the CPU itself malfunctions, and therefore, cannot perform a recovery processing, such as eliminating the cause of the malfunction, there is a possibility that the system further falls into an abnormal condition if the CPU malfunctions.

SUMMARY OF THE INVENTION

The present invention is proposed to solve the above problem. It is therefore an object of the present invention to provide a microcomputer capable of causing a CPU to perform a recovery processing when the CPU malfunctions to provide an instruction to perform an unauthorized processing.

In accordance with one aspect of the present invention, there is provided a microcomputer comprising: a plurality of clock generating sources for generating a plurality of clock signals having different frequencies; a selecting unit for selecting one of the plurality of clock signals generated by the plurality of clock generating sources according to a selection instruction from a central processing unit or CPU; a clock generation stop unit, responsive to a stop instruction to stop generation of a clock signal other than the selected clock signal from the CPU, for causing a corresponding clock generating source to stop the generation of the clock signal; and an unauthorized stop process detecting unit, responsive to a stop instruction to stop the generation of the selected clock signal from the CPU, for determining that the CPU has provided an instruction to perform an unauthorized process of causing a selected clock generating source to stop the generation of the selected clock signal.

In accordance with a preferred embodiment of the present invention, when the unauthorized stop process detecting unit determines that the CPU has provided an instruction to perform an unauthorized process of causing a selected clock generating source to stop the generation of the selected clock signal, it furnishes an interruption signal to the CPU.

In accordance with another preferred embodiment of the present invention, when the unauthorized stop process detecting unit determines that the CPU has provided an instruction to perform an unauthorized process of causing a selected clock generating source to stop the generation of the selected clock signal, it resets the CPU.

In accordance with another preferred embodiment of the present invention, when the unauthorized stop process detecting unit determines that the CPU has provided an instruction to perform an unauthorized process of causing a selected clock generating source to stop the generation of the selected clock signal, it resets a system equipped with the microcomputer.

In accordance with another aspect of the present invention, there is provided a microcomputer comprising: a plurality of clock generating sources for generating a plurality of clock signals having different frequencies; a selecting unit for selecting one of the plurality of clock signals generated by the plurality of clock generating sources according to a selection instruction from a central processing unit or CPU; a clock generation stop unit, responsive to a stop instruction to stop generation of a clock signal other than the selected clock signal from the CPU, for causing a corresponding clock generating source to stop the generation of the clock signal; and a clock generation stop detecting unit for monitoring generation of the clock signal selected by the selecting unit, and for determining whether or not the generation of the selected clock signal is stopped.

In accordance with a preferred embodiment of the present invention, when the clock generation stop detecting unit determines that the generation of the selected clock signal is stopped, it furnishes an interruption signal to the CPU.

In accordance with another preferred embodiment of the present invention, when the clock generation stop detecting unit determines that the generation of the selected clock signal is stopped, it resets the CPU.

In accordance with another preferred embodiment of the present invention, when the clock generation stop detecting unit determines that the generation of the selected clock signal is stopped, it resets a system equipped with the microcomputer.

Further objects and advantages of the present invention will be apparent from the following description of the preferred embodiments of the invention as illustrated in the accompanying drawings.

DETAILED DESCRIPTION OF THE PREFERRED EMBODIMENTS

Embodiment 1

Figure 1:
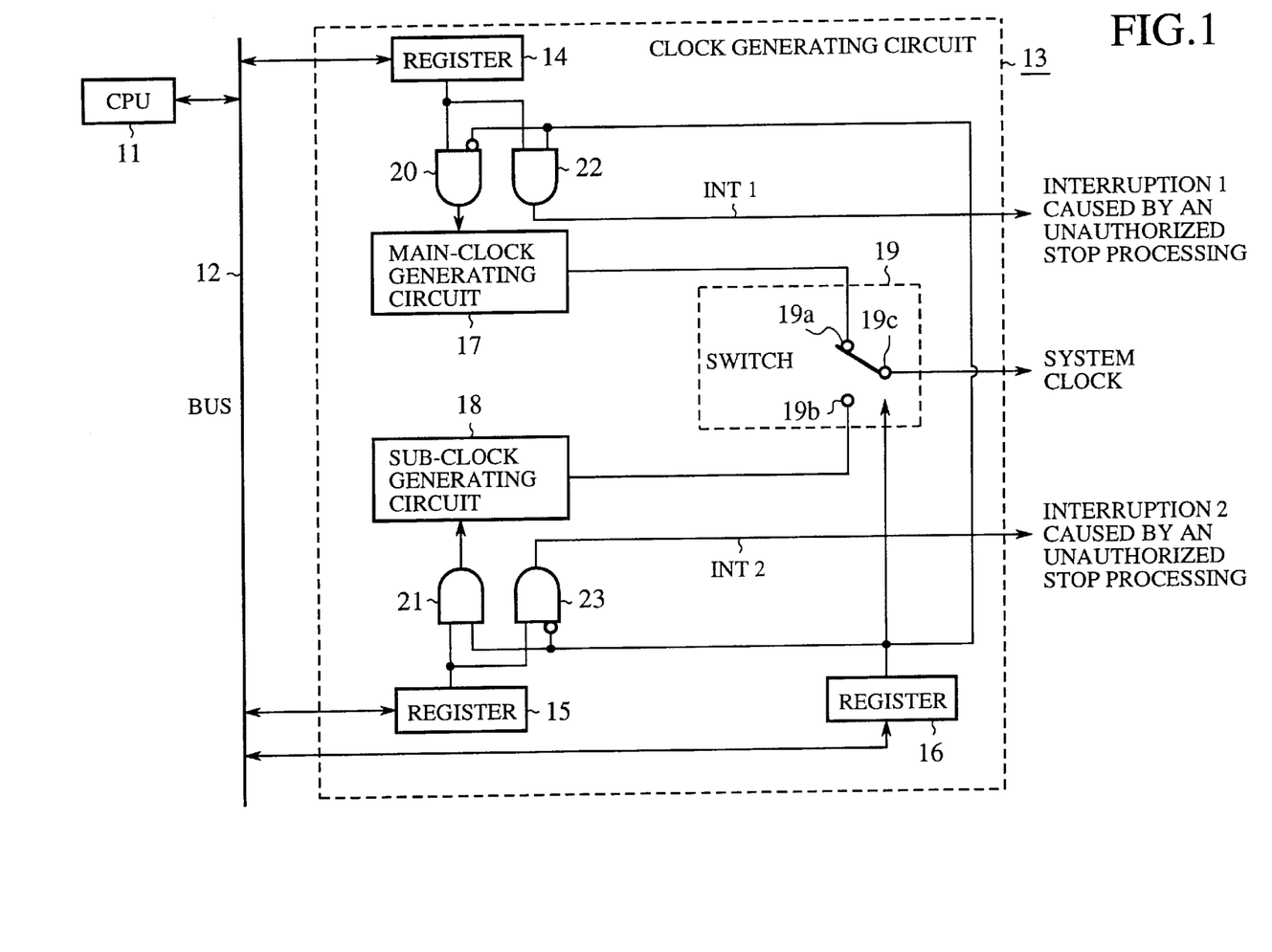
FIG. 1 is a block diagram showing the structure of a microcomputer according to a first embodiment of the present invention.

Referring next to FIG. 1, it illustrates a block diagram showing the structure of a microcomputer according to a first embodiment of the present invention. In the figure, reference numeral 11 denotes a CPU built in the microcomputer, numeral 12 denotes a bus for connecting the CPU 11 to a clock generating circuit 13 for generating a clock signal as a system clock, numeral 14 denotes a first register for storing a control value to control the oscillating state of a main-clock generating circuit 17, numeral 15 denotes a second register for storing a control value to control the oscillating state of a sub-clock generating circuit 18, and numeral 16 denotes a third register for storing a control value, which corresponds to a selection instruction from the CPU 11, to control a switch 19 so that the switch switches between two destinations or two input terminals to connect one of them to its output terminal.

In this embodiment, the microcomputer comprises two clock generating sources: the main-clock generating circuit 17 for generating a high-speed clock signal having a frequency in a MHz range, and the sub-clock generating circuit 18, such as a ring oscillator, for generating a low-speed clock signal having a frequency lower than that of the high-speed clock signal generated by the main-clock generating circuit 17. As an alternative, the microcomputer can include three or more clock generating sources.

The switch 19 selects either the main-clock signal from the main-clock generating circuit 17 applied thereto via the input terminal 19a thereof or the sub-clock signal from the sub-clock generating circuit 18 applied thereto via the other input terminal 19b thereof, and then furnishes the selected clock signal, via the output terminal 19c, to the CPU and so on, according to the control value stored in the third register 16.

In addition, reference numeral 20 denotes a first logic gate for causing the main-clock generating circuit 17 to stop the generation of the high-speed clock signal once a control value "1" is stored in the first register 14 while the switch 19 selects the low-speed clock signal from the sub-clock generating circuit 18, and for neglecting an instruction to stop the generation of the high-speed clock signal from the CPU 11 even though a control value "1" is stored in the first register 14 while the switch 19 selects the high-speed clock signal from the main-clock generating circuit 17, and numeral 21 denotes a second logic gate for causing the sub-clock generating circuit 18 to stop the generation of the low-speed clock signal once a control value "1" is stored in the second register 15 while the switch 19 selects the high-speed clock signal from the main-clock generating circuit 17, and for neglecting an instruction to stop the generation of the low-speed clock signal from the CPU 11 even though a control value "1" is stored in the second register 15 while the switch 19 selects the low-speed clock signal from the sub-clock generating circuit 18.

Furthermore, reference numeral 22 denotes a third logic gate for determining that the CPU 11 has provided an instruction to perform an unauthorized clock generation stop processing once a control value "1" is stored in the first register 14 while the switch 19 selects the high-speed clock signal from the main-clock signal generating circuit 17, and for furnishing an interruption signal INT1 to the CPU 11 when detecting a start of an unauthorized clock generation stop processing, and numeral 23 denotes a fourth logic gate for determining that the CPU 11 has provided an instruction to perform an unauthorized clock generation stop processing once a control value "1" is stored in the second register 15 while the switch 19 selects the low-speed clock signal from the sub-clock signal generating circuit 18, and for furnishing an interruption signal INT2 to the CPU 11 when detecting a start of an unauthorized clock generation stop processing.

Figure 2:
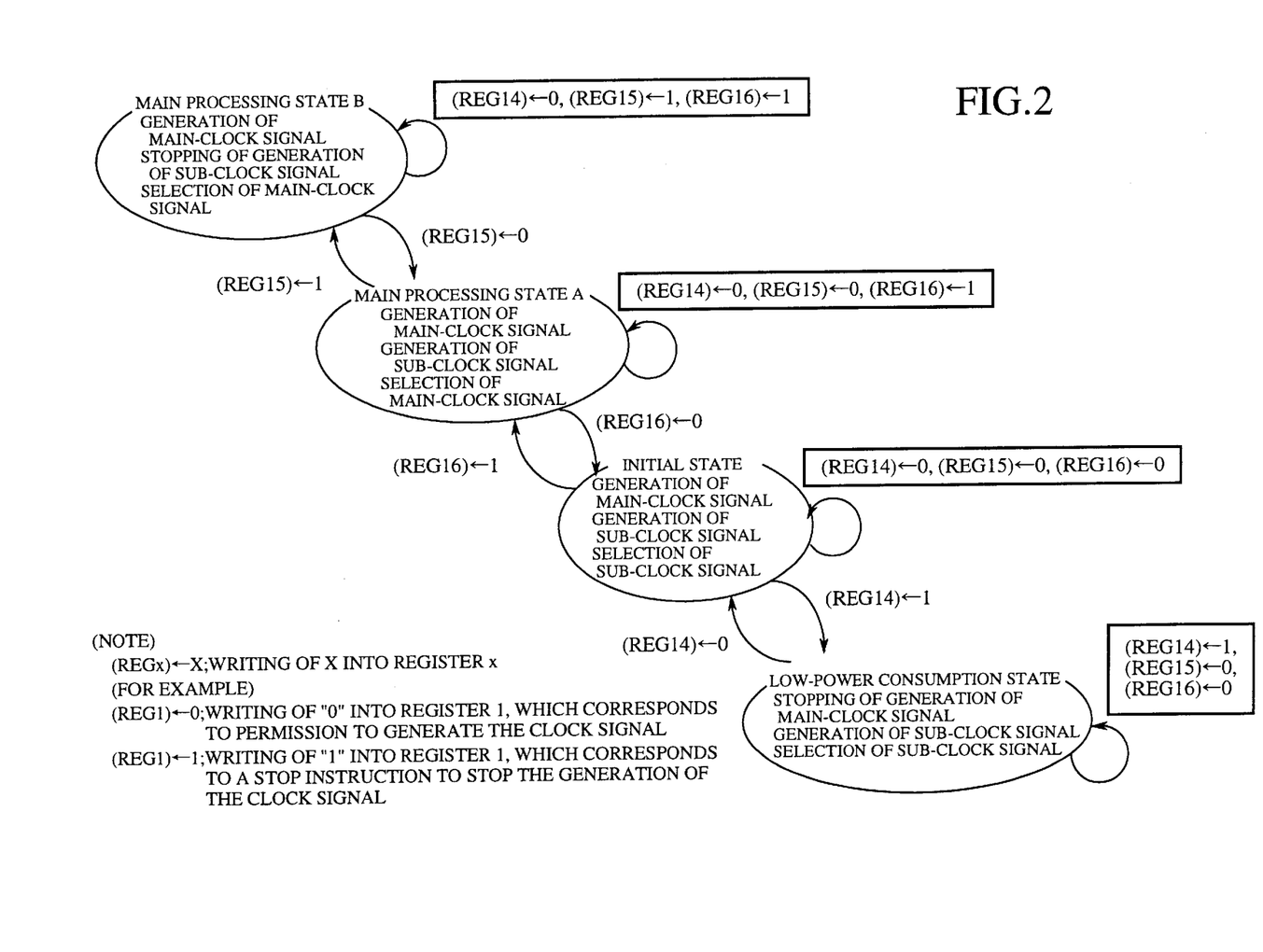
FIG. 2 is a state transition diagram showing the state transition of a clock generating circuit included with the microcomputer of the first embodiment.

FIG. 2 is a state transition diagram showing the state transition of the clock generating circuit 13.

Next, a description will be made as to the operation of the microcomputer of the first embodiment with reference to FIGS. 1 and 2. For simplicity, assume that the clock generating circuit 13 is initially held in an initial state as follows:
(1) The main clock generating circuit 17 is oscillating. In other words, the control value stored in the first register 14 is "0".
(2) The sub-clock generating circuit 18 is oscillating. In other words, the control value stored in the second register 15 is "0".
(3) The switch 19 selects the low-speed clock signal generated by the sub-clock generating circuit 18. In other words, the control value stored in the third register 16 is "0".

When there is a need to provide a high-speed operating condition while the clock generating circuit 13 is held in the initial state, the CPU 11 provides a selection instruction to select the main-clock generating circuit 17 for the third register 16 to rewrite a new control value "1" into the third register 16 and stores the new control value "1" in the third register to use the high-speed clock signal generated by the main-clock generating circuit 17. As a result, the switch 19 changes the connecting destination of the output terminal 19c from the second input terminal 19b to the first input terminal 19a, so that the clock generating circuit 13 makes a state transition from the initial state to a main processing state A. In other words, the clock generating circuit 13 selects the high-speed clock signal from the main-clock generating circuit 17 and then furnishes the high-speed clock signal, as the system clock, to the CPU 11 and so on.

The clock generating circuit 13 is then held in the main processing state A as follows:
(1) The main clock generating circuit 17 is oscillating. In other words, the control value stored in the first register 14 is "0".
(2) The sub-clock generating circuit 18 is oscillating. In other words, the control value stored in the second register 15 is "0".
(3) The switch 19 selects the high-speed clock signal generated by the main-clock generating circuit 17. In other words, the control value stored in the third register 16 is "1".

When the clock generating circuit 13 makes a state transition to the above-mentioned main processing state A, the CPU 11 uses the high-speed clock signal from the main-clock generating circuit 17 as the system clock. In the meantime, if there is no circuit element or the like within the system that uses the low-speed clock signal generated by the sub-clock generating circuit 18, the CPU 11 furnishes a clock generation stop instruction to stop the generation of the low-speed clock signal by the sub-clock generating circuit 18 to the second register 15 to rewrite a new control value "1" into the second register 15, in order to reduce the power consumption.

As a result, the sub-clock generating circuit 18 stops the generation of the low-speed clock signal, and the clock generating circuit 13 makes a state transition from the main processing state A to the following main processing state B:
(1) The main clock generating circuit 17 is oscillating. In other words, the control value stored in the first register 14 is "0".
(2) The sub-clock generating circuit 18 is in a stopped state. In other words, the control value stored in the second register 15 is "1".
(3) The switch 19 selects the high-speed clock signal generated by the main-clock generating circuit 17. In other words, the control value stored in the third register 16 is "1".

When there exists at least a circuit component that uses the low-speed clock signal generated by the sub-clock generating circuit 18, or when the CPU 11 makes a transition to a sleep state while the clock generating circuit 13 is held in the main processing state B, the CPU 11 provides a clock generation instruction to restart the sub-clock generating circuit 18 for the second register 15 to rewrite a new control value "1" into the second register 15, in order to cause the sub-clock generating circuit 18 to restart oscillating.

As a result, the sub-clock generating circuit 18 restarts generating the low-speed clock signal, and the clock generating circuit 13 then makes a state transition from the main processing state B to the following main processing state A.
(1) The main clock generating circuit 17 is oscillating. In other words, the control value stored in the first register 14 is "0".
(2) The sub-clock generating circuit 18 is oscillating. In other words, the control value stored in the second register 15 is "0".
(3) The switch 19 selects the high-speed clock signal generated by the main-clock generating circuit 17. In other words, the control value stored in the third register 16 is "1".

If the clock generating circuit 13 does not include the first logic gate 20, the main-clock generating circuit 17 stops the generation of the high-speed clock signal and the system therefore comes to a deadlock if the CPU 11 malfunctions and then provides an instruction to stop the main-clock generating circuit 17 for the first register 14 to rewrite a new control value "1" into the first register 14 while the clock generating circuit 13 is held in the main processing state B, like the clock generating circuit 3 of the prior art microcomputer. In contrast, in accordance with the first embodiment, since the first logic gate 20 can neglect a clock generation stop instruction to stop the main-clock generating circuit 17 even though a new control value "1" is written into the first register 14 while the high-speed clock signal from the main-clock generating circuit 17 is selected, the main-clock generating circuit 17 is allowed to continue to oscillate, so that the system does not reach a deadlock.

At that time, when such a malfunction mentioned above occurs, that is, when a new control value "1" is stored in the first register 14 while the switch 19 selects the high-speed clock signal from the main-clock generating circuit 17, the third logic gate 22 can determine that the provided instruction to perform the clock generation stop processing is an unauthorized one (or detect the start of the unauthorized clock generation stop processing) and then furnish an interruption signal INT1 to the CPU 11. As a result, the CPU can recognize that it is brought into a state in which the CPU itself works under abnormal conditions from the interruption signal INT1. Then the CPU can perform a necessary recovery processing to prevent the whole of the system into which the microcomputer is incorporated from falling into an unexpected abnormal condition, and then make a transition to a state such as an idle state or a stopped state.

When there is no need to provide a high-speed operating condition after the CPU 11 has made a state transition to the main processing state A, the CPU 11 provides a selection instruction to select the sub-clock generating circuit 18 for the third register 16 to rewrite a new control value "0" into the third register 16, in order to use the low-speed clock signal generated by the sub-clock generating circuit 18.

As a result, the switch 19 changes the connecting destination of the output terminal 19c from the first input terminal 19a to the second input terminal 19b, so that the clock generating circuit 13 makes a state transition from the main processing state A to the following initial state.

(1) The main clock generating circuit 17 is oscillating. In other words, the control value stored in the first register 14 is "0".
(2) The sub-clock generating circuit 18 is oscillating. In other words, the control value stored in the second register 15 is "0".
(3) The switch 19 selects the low-speed clock signal generated by the sub-clock generating circuit 18. In other words, the control value stored in the third register 16 is "0".

After the clock generating circuit 13 has made a state transition to the initial state, the CPU 11 uses the low-speed clock signal from the sub-clock generating circuit 18 as the system clock. In the meantime, if there is no circuit element or the like within the system that uses the high-speed clock signal generated by the main-clock generating circuit 17 or if the system makes a transition to a sleeping state, the CPU 11 provides a clock generation stop instruction to stop the generation of the high-speed clock signal by the main-clock generating circuit 17 for the first register 14 to rewrite a new control value "1" into the first register 14, in order to reduce the power consumption.

As a result, the main-clock generating circuit 17 stops the generation of the high-speed clock signal, and the clock generating circuit 13 makes a state transition from the initial state to the following low-power consumption state.

(1) The main clock generating circuit 17 is in a stopped state. In other words, the control value stored in the first register 14 is "1".
(2) The sub-clock generating circuit 18 is oscillating. In other words, the control value stored in the second register 15 is "0".
(3) The switch 19 selects the low-speed clock signal generated by the sub-clock generating circuit 18. In other words, the control value stored in the third register 16 is "0".

When there is a need to provide a high-speed operating condition or the like while the clock generating circuit 13 is held in the low-power consumption state, the CPU 11 provides a clock generation instruction to restart the main-clock generating circuit 17 for the first register 14 to rewrite a new control value "0" into the register 14, in order to cause the main-clock generating circuit 17 to restart oscillating.

As a result, the main-clock generating circuit 17 restarts generating the high-speed clock signal, and the clock generating circuit 13 then makes a state transition from the low-power consumption state to the following initial state.
(1) The main clock generating circuit 17 is oscillating. In other words, the control value stored in the first register 14 is "0".
(2) The sub-clock generating circuit 18 is oscillating. In other words, the control value stored in the second register 15 is "0".
(3) The switch 19 selects the low-speed clock signal generated by the sub-clock generating circuit 18. In other words, the control value stored in the third register 16 is "0".

If the clock generating circuit 13 does not include the second logic gate 21, the sub-clock generating circuit 18 stops the generation of the low-speed clock signal and the system therefore comes to a deadlock if the CPU 11 malfunctions and then provides a clock generation stop instruction to stop the sub-clock generating circuit 18 to the second register 15 to rewrite a new control value "1" into the second register 15 while the clock generating circuit 13 is held in the low-power consumption state, like the clock generating circuit 3 of the prior art microcomputer. In contrast, in accordance with the first embodiment, since the first logic gate 21 can neglect the instruction to stop the sub-clock generating circuit 18 even though a new control value "1" is written into the second register 15 while the low-speed clock signal from the sub-clock generating circuit 18 is selected, the sub-clock generating circuit 18 is allowed to continue to oscillate, so that the system does not reach a deadlock.

At that time, when such a malfunction mentioned above occurs, that is, when a new control value "1" is stored in the second register 15 while the switch 19 selects the low-speed clock signal from the low-clock generating circuit 18, the fourth logic gate 23 can determine that the provided instruction to perform the clock generation stop processing is an unauthorized one (or detect the start of the unauthorized clock generation stop processing) and then furnish an interruption signal INT2 to the CPU 11. As a result, the CPU 11 can recognize that it is brought into a state in which the CPU itself works under abnormal conditions from the interruption signal INT2. Then the CPU 11 can perform a necessary recovery processing to prevent the whole of the system into which the microcomputer is incorporated from falling into an unexpected abnormal condition, and make a transition to a state such as an idle state or a stopped state.

As can be seen from the above description, in accordance with the first embodiment, the microcomputer can detect a start of an unauthorized clock generation stop processing and furnish an interruption signal to the CPU 11 when receiving a clock generation stop instruction to cause a clock generating source to stop generating of a clock signal, which is selected by the switch 19, from the CPU 11. The first embodiment can thus provide the advantage of being able to cause the CPU to perform a recovery processing when the CPU 11 malfunctions to provide an unauthorized clock generation stop instruction.

Embodiment 2

Figure 3:
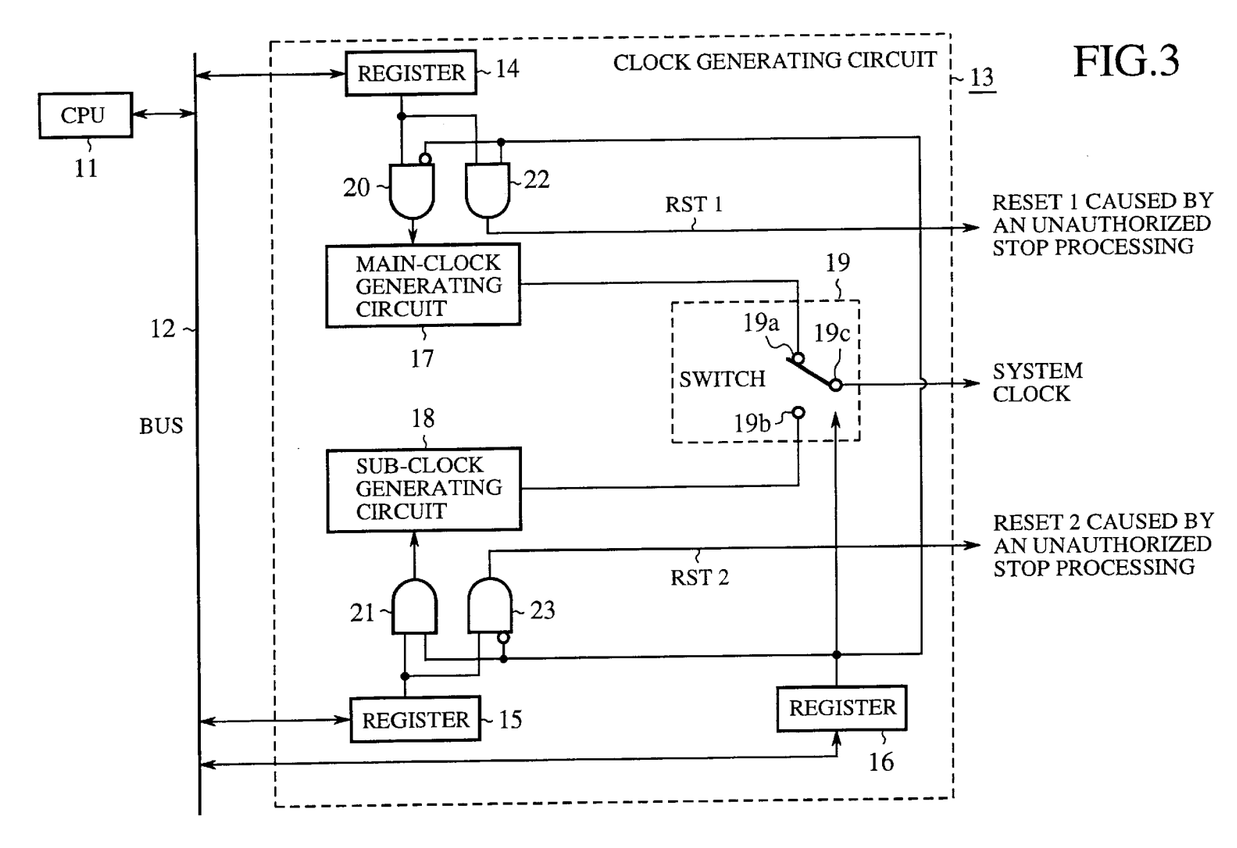
FIG. 3 is a lock diagram showing the structure of a microcomputer according to a second embodiment of the present invention.

In the first embodiment mentioned above, the third logic gate 22 furnishes an interruption signal INT1 to the CPU 11 when it determines that the CPU 11 has provided an instruction to perform an unauthorized process of stopping the generation of the high-speed clock or main-clock signal. In addition, the fourth logic gate 23 furnishes an interruption signal INT2 to the CPU 11 when it determines that the CPU 11 has provided an instruction to perform an unauthorized process of stopping the generation of the low-speed clock or sub-clock signal. In accordance with a second embodiment of the present invention, there is provided a microcomputer including a clock generating circuit 13 provided with a third logic gate for furnishing a reset signal RST1 to a CPU 11 when it determines that the CPU 11 has provided an instruction to perform an unauthorized process of stopping generation of a main-clock signal, and a fourth logic gate 23 for furnishing a reset signal RST2 to the CPU 11 when it determines that the CPU 11 has provided an instruction to perform an unauthorized process of stopping generation of a sub-clock signal, as shown in FIG. 3.

Accordingly, when the CPU 11 malfunctions to provide an unauthorized clock generation stop instruction, the microcomputer can reset the CPU 11 to cause the CPU 11 to return to a state of working properly.

Embodiment 3

In the second embodiment mentioned above, the third logic gate 22 furnishes a reset signal RST1 to the CPU 11 when it determines that the CPU 11 has provided an instruction to perform an unauthorized process of stopping the generation of the main-clock signal. In addition, the fourth logic gate 23 furnishes a reset signal RST2 to the CPU 11 when it determines that the CPU 11 has provided an instruction to perform an unauthorized process of stopping the generation of the sub-clock signal. In accordance with a third embodiment of the present invention, there is provided a microcomputer including a clock generating circuit 13 provided with a third logic gate 22 for generating a reset signal RST1 to reset the whole of the system equipped with the microcomputer when it determines that a CPU 11 has provided an instruction to perform an unauthorized process of stopping generation of a main-clock signal, and a fourth logic gate 23 for generating a reset signal RST2 to reset the whole of the system when it determines that the CPU 11 has provided an instruction to perform an unauthorized process of stopping generation of a sub-clock signal.

Accordingly, when the CPU 11 malfunctions to provide an unauthorized clock generation stop instruction, the microcomputer can reset the system equipped with the microcomputer to cause the system to return to a state of working properly.

Embodiment 4

Figure 4:
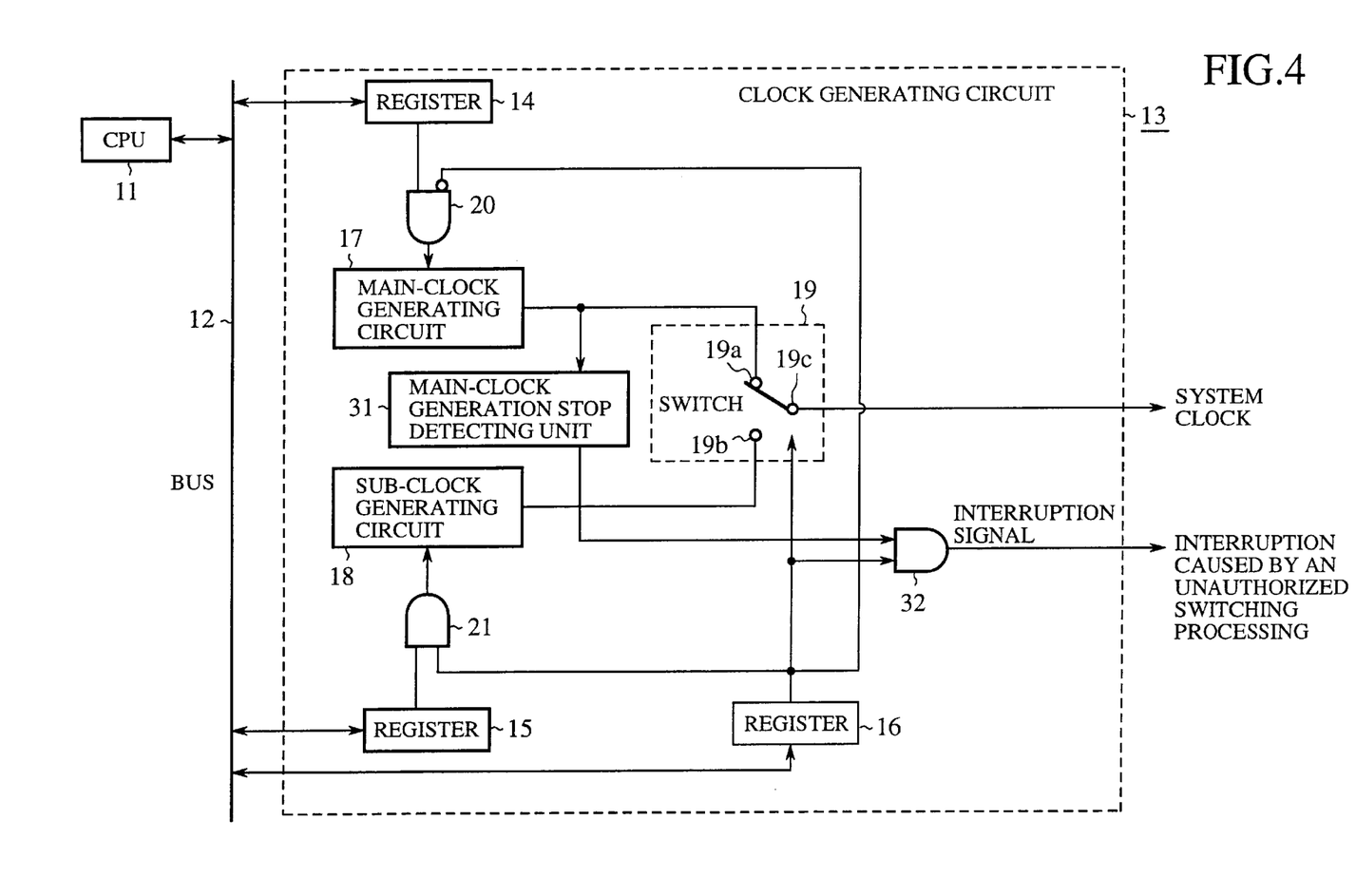
FIG. 4 is a block diagram showing the structure of a microcomputer according to a fourth embodiment of the present invention.

Referring next to FIG. 4, it illustrates a block diagram showing the structure of a microcomputer according to a fourth embodiment of the present invention. In the figure, the same reference numerals as shown in FIG. 1 designate the same components as of the first embodiment, or like components, and therefore the description of those components will be omitted hereinafter.

In FIG. 4, reference numeral 31 denotes a main-clock generation stop detecting circuit for monitoring generation of a main-clock signal by a main-clock generating circuit 17, and numeral 32 denotes a logic gate for furnishing an interruption signal to a CPU 11 when the main-clock generation stop detecting circuit 31 detects a stop of the generation of the main-clock signal.

In the above-mentioned first embodiment, the third logic gate 22 furnishes an interruption signal INT1 to the CPU 11 when it determines that the CPU 11 has provided an instruction to perform an unauthorized process of stopping the generation of the main-clock signal. In addition, the fourth logic gate 23 furnishes an interruption signal INT2 to the CPU 11 when it determines that the CPU 11 has provided an instruction to perform an unauthorized process of stopping the generation of the sub-clock signal. In contrast, in accordance with the fourth embodiment of the present invention, a clock generating circuit 13 furnishes an interruption signal to the CPU 11 when the CPU 11 malfunctions to select the main-clock signal from the main-clock generating circuit 17 while the clock generating circuit 13 is held in a low-power consumption state. In other words, since the main-clock generating circuit 17 stops the generation of the main-clock signal while the clock generating circuit 13 is held in the low-power consumption state, the system comes to a deadlock if a switch 19 selects the main-clock signal from the main-clock generating circuit 17.

To avoid the malfunction, in accordance with the fourth embodiment, the main-clock generation stop detecting circuit 31 monitors the generation of the main-clock signal by the main-clock generating circuit 17. When the main-clock generation stop detecting circuit 31 detects a stop of the generation of the main-clock signal and the CPU 11 then furnishes a selection instruction to select the main-clock signal from the main-clock generating circuit 17 to store a control value "1" in a third register 16, the logic gate 32 furnishes an interruption signal to the CPU 11.

Accordingly, the fourth embodiment offers the same advantage as provided by the first embodiment mentioned above.

In a variant of the embodiment shown, the clock generating circuit 13 can include a sub-clock generation stop detecting circuit for monitoring generation of the sub-clock signal by the sub-clock generating circuit 18 to detect a stop of the generation of the sub-clock signal, instead of the main-clock generation stop detecting circuit 31 for monitoring the generation of the main-clock signal by the main-clock generating circuit 17 to detect a stop of the generation of the main-clock signal. This variant can offer the advantage of being able to cause the CPU 11 to perform a recovery processing even though the CPU 1 malfunctions to furnish a selection instruction to select the sub-clock signal from the sub-clock generating circuit 18 while the clock generating circuit 13 is held in the main processing state B mentioned above in Embodiment 1.

Embodiment 5

Figure 5:
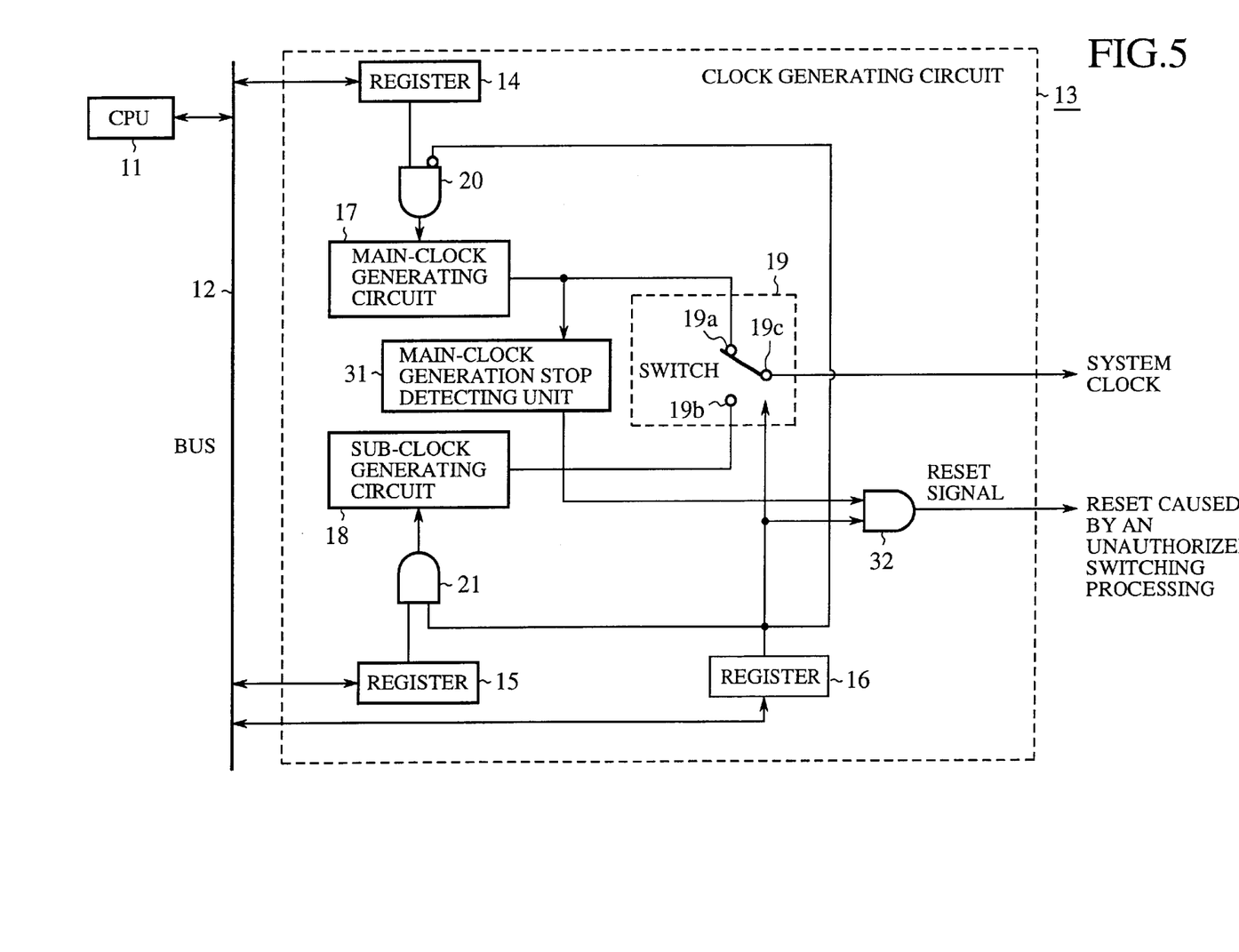
FIG. 5 is a block diagram showing the structure of a microcomputer according to a fifth embodiment of the present invention.
Figure 6:
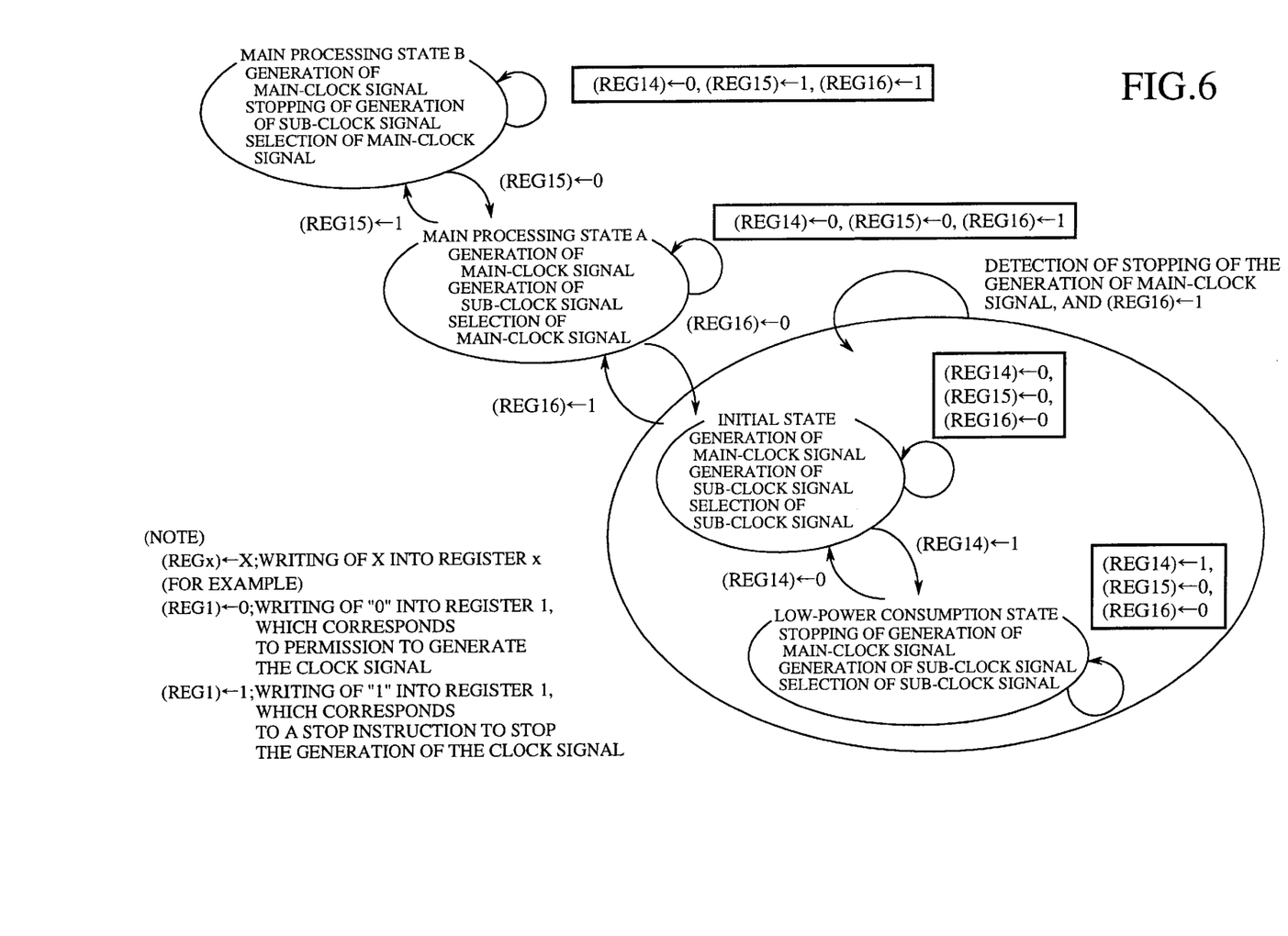
FIG. 6 is a state transition diagram showing the state transition of a clock generating circuit included with the microcomputer of the fifth embodiment.

In the fourth embodiment mentioned above, the logic gate 32 furnishes an interruption signal to the CPU 11 when it determines that the CPU 11 provides an instruction to perform an unauthorized process of selecting the main-clock signal. In accordance with a fifth embodiment of the present invention, there is provided a microcomputer including a clock generating circuit 13 provided with a logic gate 32 for furnishing a reset signal to a CPU 11 when it determines that an instruction to select a main-clock signal or sub-clock signal from the CPU 11 is an unauthorized one, as shown in FIGS. 5 and 6.

Accordingly, when the CPU 11 malfunctions to provide an unauthorized instruction to select the main-clock signal or sub-clock signal, the microcomputer can reset the CPU 11 to cause the CPU 11 to return to a state of working properly (i.e., initial state).

Embodiment 6

In the fifth embodiment mentioned above, the logic gate 32 furnishes a reset signal to the CPU 11 when it determines that an instruction to select the main-clock signal or sub-clock signal from the CPU 11 is an unauthorized one. In accordance with a sixth embodiment of the present invention, there is provided a microcomputer including a clock generating circuit 13 provided with a logic gate 32 for generating a reset signal RST1 to reset the whole of the system equipped with the microcomputer when it determines that an instruction to select either a main-clock signal or sub-clock signal from a CPU 11 is an unauthorized one.

Accordingly, when the CPU 11 malfunctions to provide an unauthorized instruction to select the main-clock signal or sub-clock signal, the microcomputer can reset the system equipped with the microcomputer to cause the system to return to a state of working properly.

Many widely different embodiments of the present invention may be constructed without departing from the spirit and scope of the present invention. It should be understood that the present invention is not limited to the specific embodiments described in the specification, except as defined in the appended claims.

What is claimed is:

1. A microcomputer comprising:

a plurality of clock generating sources for generating a plurality of clock signals having different frequencies, respectively;

selecting means for selecting one of the plurality of clock signals generated by said plurality of clock generating sources according to a selection instruction from a central processing unit or CPU;

clock generation stop means, responsive to a stop instruction to stop generation of a clock signal other than said selected clock signal from said CPU, for causing a corresponding clock generating source to stop the generation of the clock signal; and unauthorized stop process detecting means, responsive to a stop instruction to stop the generation of said selected clock signal from said CPU, for determining that said CPU has provided an instruction to perform an unauthorized process of causing a selected clock generating source to stop the generation of said selected clock signal.

2. The microcomputer according to claim 1, wherein when said unauthorized stop process detecting means determines that said CPU has provided an instruction to perform an unauthorized process of causing a selected clock generating source to stop the generation of said selected clock signal, it furnishes an interruption signal to said CPU.

3. The microcomputer according to claim 1, wherein when said unauthorized stop process detecting means determines that said CPU has provided an instruction to perform an unauthorized process of causing a selected clock generating source to stop the generation of said selected clock signal, it resets said CPU.

4. The microcomputer according to claim 1, wherein when said unauthorized stop process detecting means determines that said CPU has provided an instruction to perform an unauthorized process of causing a selected clock generating source to stop the generation of said selected clock signal, it resets a system equipped with said microcomputer.

5. A microcomputer comprising:

a plurality of clock generating sources for generating a plurality of clock signals having different frequencies, respectively;

selecting means for selecting one of the plurality of clock signals generated by said plurality of clock generating sources according to a selection instruction from a central processing unit or CPU;

clock generation stop means, responsive to a stop instruction to stop generation of a clock signal other than said selected clock signal from said CPU, for causing a corresponding clock generating source to stop the generation of the clock signal; and clock generation stop detecting means for monitoring generation of said clock signal selected by said selecting means, and for determining whether or not the generation of said selected clock signal is stopped.

6. The microcomputer according to claim 5, wherein when said clock generation stop detecting means determines that the generation of said selected clock signal is stopped, it furnishes an interruption signal to said CPU.

7. The microcomputer according to claim 5, wherein when said clock generation stop detecting means determines that the generation of said selected clock signal is stopped, it resets said CPU.

8. The microcomputer according to claim 5, wherein when said clock generation stop detecting means determines that the generation of said selected clock signal is stopped, it resets a system equipped with said microcomputer.

* * * * *